United States Patent
Bickley et al.

[11] Patent Number: 5,969,673
[45] Date of Patent: Oct. 19, 1999

[54] POSITION LOCATING RESCUE TRANSCEIVER

[75] Inventors: Robert H. Bickley, Paradise Valley; Taul Aragaki, Phoenix; Leland Lem Moy, Scottsdale; Ray O. Waddoups, Mesa, all of Ariz.

[73] Assignee: Motorola, Inc., Schaumburg, Ill.

[21] Appl. No.: 09/170,493

[22] Filed: Oct. 13, 1998

Related U.S. Application Data

[63] Continuation of application No. 08/901,010, Jul. 28, 1997, which is a continuation of application No. 08/299,029, Aug. 31, 1994, which is a continuation-in-part of application No. 08/103,177, Aug. 6, 1993, which is a continuation of application No. 07/845,903, Mar. 4, 1992.

[51] Int. Cl.$^6$ ............... H04B 7/185; G01S 5/02
[52] U.S. Cl. ............... 342/357.09; 342/357.07; 342/457; 701/213
[58] Field of Search ............... 342/357, 457, 342/357.09, 357.07; 701/213

[56] References Cited

U.S. PATENT DOCUMENTS 3,876,980  4/1975  Haemmig et al. .

*Primary Examiner*—Theodore M. Blum
*Attorney, Agent, or Firm*—Frank J. Bogacz; Bradley J. Botsch; John C. Scott

[57] ABSTRACT

A secure, portable position locating radio has a geolocation receiver providing local position and timing information from geolocation means (e.g. GPS satellites) and a local transceiver for sending local position information to a communication system (e.g., an airborne or orbiting transceiver). A crypto unit is provided between the receiver and local transceiver for encrypting the local position information prior to transmission. A data processor coupled to the local transceiver, receiver and crypto unit controls operation of the device, including storing local position information and separating signals broadcast by the communication system into those intended or not intended for the device. An external interface and display and a real-time clock (e.g., slaved to the GPS receiver) are also coupled to the data processor. Encryption keys and message abbreviation codes are conveniently loaded into the device from a demountable accessory unit at the interface, and stored therein.

20 Claims, 9 Drawing Sheets

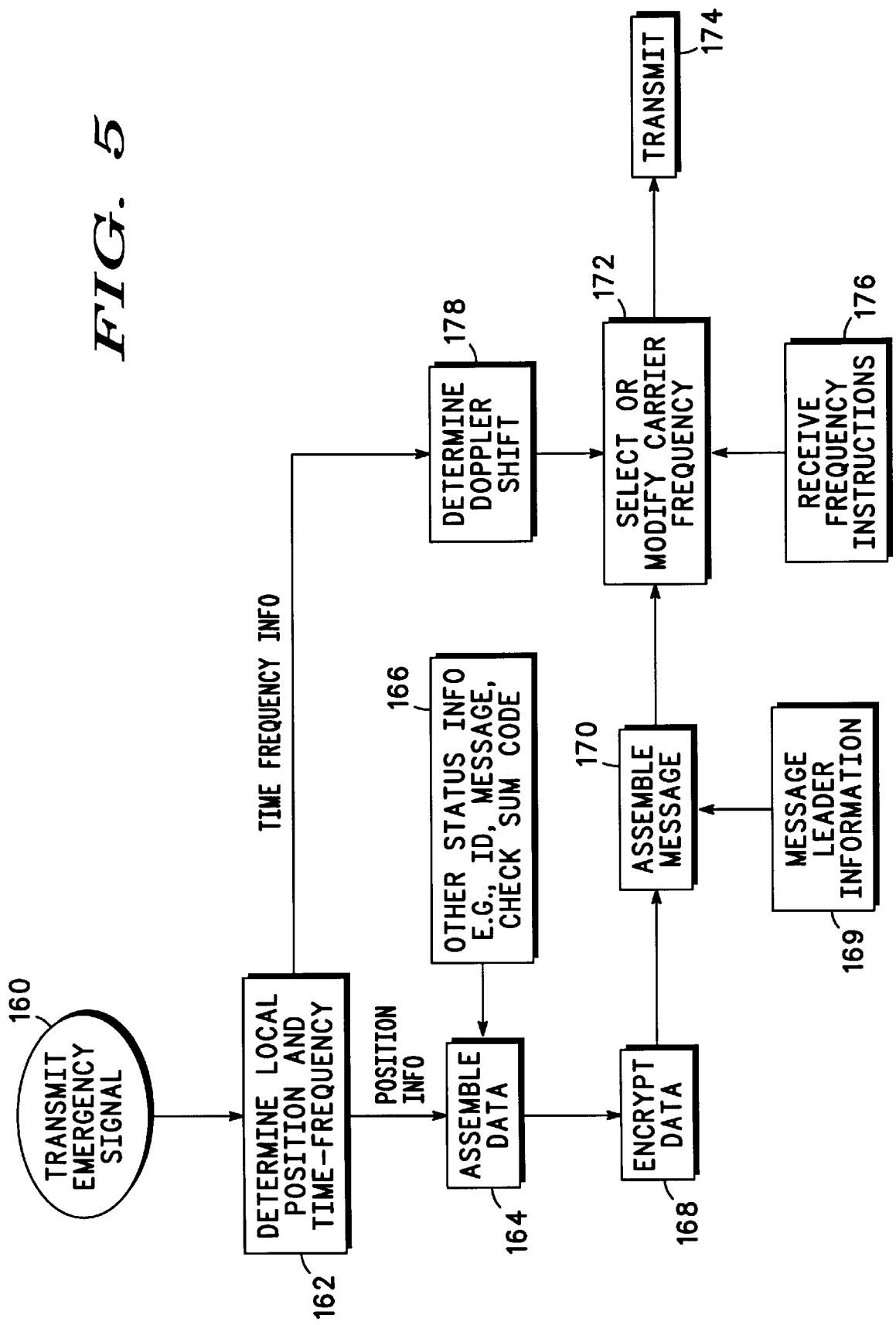

POSITION LOCATING RESCUE TRANSCEIVER

The present application is a continuation of prior U.S. application Ser. No. 08/901,010, filed on Jul. 28, 1997, which is a continuation of U.S. application Ser. No. 08/299,029, filed Aug. 31, 1994, which is a continuation-in-part of application Ser. No. 08/103,177, filed Aug. 6, 1993, which is a continuation of application Ser. No. 07/845,903 filed Mar. 4, 1992, which are hereby incorporated by reference, and priority thereto for common subject matter is hereby claimed.

FIELD OF THE INVENTION

The present invention concerns an improved means and method for portable radios and, more particularly, position locating and reporting portable radios.

BACKGROUND OF THE INVENTION

There is an ongoing need for portable radios, especially hand-portable radios, that allow a user to communicate with an airborne or satellite transceiver, where the communication includes information on the location of the user. While such radios have many uses, they are especially important in emergency and search and rescue situations.

Emergency and search and rescue radio location systems are known in the art. In one prior art arrangement known as the SARSAT System, an emergency radio transmitter continuously broadcasts a beacon signal at 406 MHz. The beacon signal is picked up and recorded by a SARSAT satellite moving in low earth orbit. Later on in its orbit, the SARSAT satellite passes over a command and control base station to which it downloads the recorded signals picked up from continuous transmitter.

The Doppler shift of the recorded signal as it approached, crossed over and receded from the beacon transmitter is analyzed in the base station and the zero Doppler time determined. By knowing the orbital location of the SARSAT satellite at the zero Doppler time, a line of position of the beacon transmitter is found. After several passes an approximate slant range and approximate position of the beacon transmitter on the earth's surface determined. This estimated position is then communicated to a rescue unit which then commences a local area search.

This approach has a number of weaknesses well known in the art. For example, the position of the emergency beacon transmitter is known only approximately, there is a substantial time lag between initiation of the emergency transmitter and the local position determination, and anyone can listen in so that the emergency signal and Doppler information are not secure.

In another prior art emergency rescue system, a mobile emergency radio sends a signal directly to a local rescue unit to allow the local rescue unit to home in on the position of the emergency radio. While such units are effective, they suffer from a number of limitations well known in the art, as for example, the rescue unit must be within range of the radio (typically line of sight) before any indication of the presence of radio can be obtained, the rescue unit must carry direction finding equipment in order to home in on the radio, and considerable time may be required to locate the emergency radio, thereby prolonging the exposure of the rescue unit and the user of the radio to any unfriendly personnel which may be in the area.

In a third prior art emergency rescue system, a standard marine radio transceiver is coupled to a LORAN or OMEGA or satellite geolocation receiver provided with a speech synthesizer. When an emergency switch on the system is activated, the normal transceiver functions are disabled and it transmits a synthesized speech "Mayday" voice call and synthesized voice stating the latitude and longitude, on the emergency channel. Other information about the vessel or emergency may also be rendered in voice by the speech synthesizer and transmitted at the same time. A provision is made so that the emergency transmitter can be disabled remotely by a signal sent to the unit. A difficulty with this system is that it has very limited range, uses open channels that can be monitored by anyone, announces the position of the emergency unit in plain language by voice, takes a substantial time to communicate the position of the emergency unit and can be disabled by a remote signal. This makes the users especially vulnerable to any unfriendlies that may be monitoring the emergency channel.

Thus, there continues to be a need for an improved radio suitable for communication with airborne or satellite transceivers or relays and which automatically provides accurate information on its local position and which is, preferably, protected against undesirable eavesdropping.

SUMMARY OF THE INVENTION

A mobile position locating radio has, in its most general form, a geolocation receiver for providing local position and timing information from geolocation means and a local transceiver coupled to the geolocation receiver for sending local position information to a world-wide communication system adapted to receive position location and other information from the radio. In a preferred embodiment, the geolocation information is provided by one or more satellites and the transceiver is adapted to communicate with a satellite communication system. A crypto unit is desirably provided between the geolocation receiver and the local transceiver for encrypting and decrypting messages to and from the mobile radio, including the local position information. A data processor is also desirably provided coupled to the receiver, crypto unit and transceiver for controlling access to and operation of the radio. The data processor desirably selects signals broadcast by world-wide communication system intended for the particular radio being used.

In a preferred embodiment there is also provided an external interface and display and a real-time clock coupled to the data processor. Crypto keys and message abbreviation codes are conveniently loaded into the device from a demountable accessory unit which couples to the interface. The local transceiver desirably operates in a burst mode and transmits during narrow time windows calculated using the local real time clock output slaved to accurate time/frequency information derived from the geolocation means.

In a further embodiment, the accurate time/frequency information is also used to correct for anticipated Doppler shift of signals broadcast by the local transmitter via the satellite communication system to a remote base station to reduce link frequency error and signal acquisition time at the base station.

In a preferred embodiment the device is small enough to be hand-held and is especially useful as an emergency radio for persons in distress. The data encryption and burst transmission features prevents those not intended to receive the message from reading the location of the transceiver and other information exchanged.

As used herein the words "base station", singular or plural, are intended to refer to a transceiver able to communicate with another transceiver or a receiver. The base station may be fixed or mobile and earth-based or airborne or in orbit. The word "satellite", singular or plural, is intended to refer to one or more objects, usually a relay transceiver (but not limited thereto), in earth orbit. The satellite may be moving with respect to the earth or geostationary. The word "receiver", singular or plural, is intended to refer to a device for receiving electromagnetic radiation. The word "transceiver", singular or plural, is intended to refer to a device for receiving and transmitting electromagnetic radiation. The word "geolocation" is intended to refer to information useful in determining local position, and the words "geolocation satellites" or "geolocation means" are intended to refer to transmitters capable of providing geolocation information.

BRIEF DESCRIPTION OF THE DRAWINGS

FIG. 5 shows a flow chart depicting mobile radio signaling operation;

DETAILED DESCRIPTION OF THE DRAWINGS

The present invention is described in terms of certain geolocation and communication satellite facilities, but this is merely for convenience of explanation and not intended to be limiting. As those of skill in the art will appreciate based on the description herein, the invented method and system are not limited to the particular geolocation and communication systems used for illustration and the present invention is not intended to be limited thereto and applies to other geolocation and communication systems as well.

Figure 1:
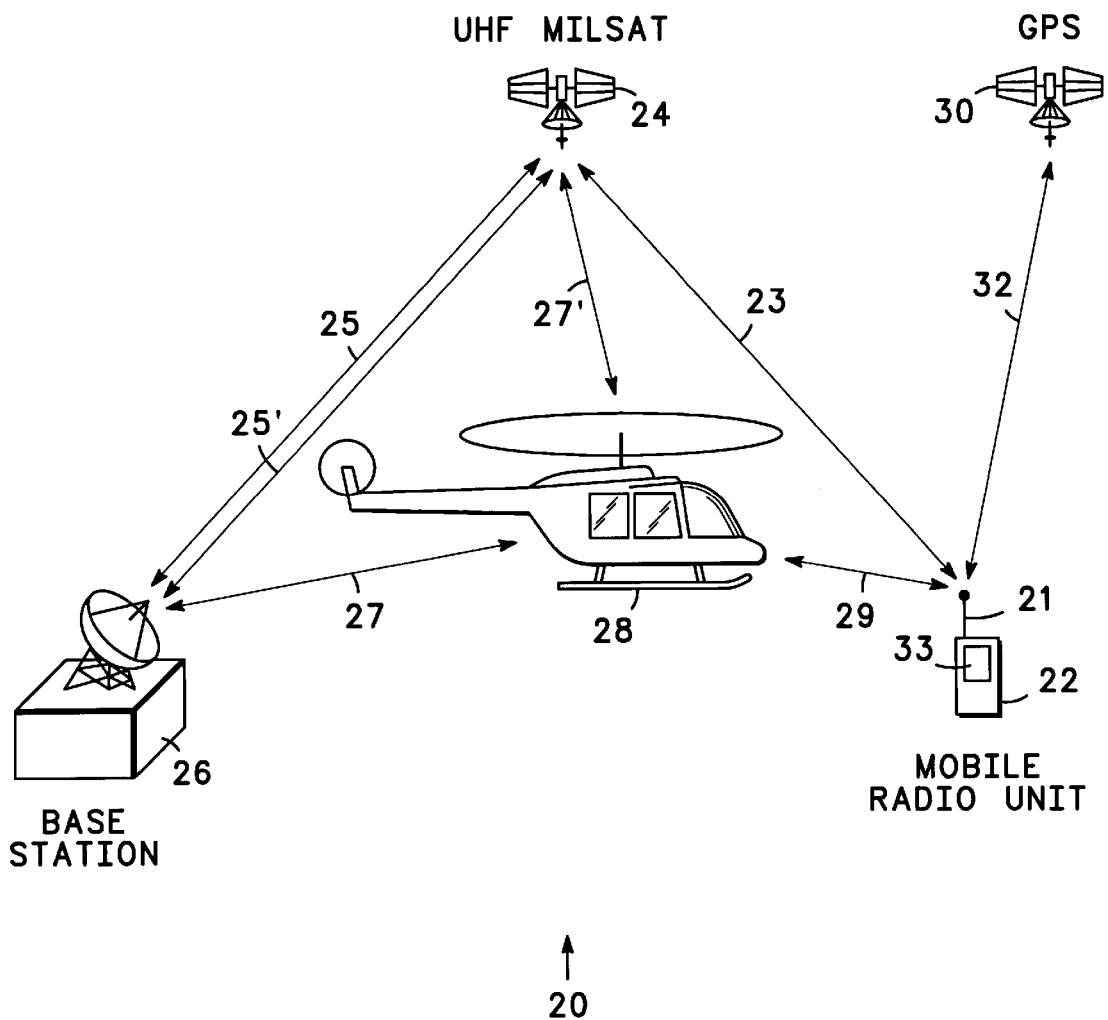
FIG. 1 illustrates a radio system used for search and rescue according to the present invention.

FIG. 1 illustrates radio system 20 suitable for use for search and rescue and other functions according to the present invention. System 20 comprises mobile radio unit 22 which communicates through antenna 21 and link 23 with satellite transceiver 24, which in turn communicates via link 25 with base station 26 which in turn relays information via link 27 to rescue unit 28.

The well known MILSAT satellite system is suitable for transceiver 24. This system functions as a bi-directional relay transceiver, receiving signals from any source in its receive antenna footprint on one set of UHF channels (e.g., 290 to 318 MHz) and retransmitting the received signals on another set of UHF channels (e.g., 240 to 270 MHz) to any receiver in its transmit antenna footprint. Intermediate relays, e.g., satellite-satellite or satellite-ground-satellite, may also be used. Such an arrangement is referred to in the art as a "bent pipe" communication channel. While MILSAT is suitable, other satellite or airborne transceivers may also be used, as for example but not limited to the IRIDIUM™/ SM satellite cellular communication system currently being constructed by Motorola, Inc. In general, the satellite communication link is referred to as a "SATCOM" link.

Mobile radio 22 receives information from geolocation satellite (or satellites) 30 via down-link 32. The well known Global Positioning System (GPS) satellites are a suitable source of geolocation information and are preferred, but other geolocation means may also be used. For example, the IRIDIUM and GLONAS satellite systems also provide geolocation information.

GPS satellites transmit typically in L band (e.g., 1.227 and 1.575 GHz). To facilitate receipt of geolocation information from geolocation means 30, separate antenna 33 is desirably provided on radio 22 to accommodate the GPS frequencies.

Based on the geolocation information received from geolocation means 30, radio 22 calculates its local position in some convenient coordinate system, as for example but not limited to, latitude and longitude. The accuracy of the geolocation information received from GPS satellites is such that the local position of radio 22 may be determined typically to within about 25 to 100 meters. The accuracy of the position determined from GPS may depend upon whether or not the GPS system is functioning in its high or low resolution mode and/or whether the receiver is capable of decoding the high resolution mode. In any case, the accuracy with which the local position can be determined is much greater than that which would be obtained were geolocation system 30 not utilized. Radio 22 then transmits this local position information over links 23, 25 via satellite 24 to station 26. In a preferred embodiment, this position information is encrypted prior to transmission by radio 22. GPS receivers and means and methods for processing GPS signals to obtain an accurate local position are well known in the art and GPS receivers are commercially available from numerous sources.

In a preferred embodiment, station 26 sends an acknowledgment signal back to mobile unit 22 via links 25, 23 and satellite 24, indicating that it has received the local position information from unit 22. Station 26 then passes this local position information via link 27 (or links 25', 27') to rescue station or unit 28. Since rescue unit 28 now has a relatively precise local position of radio 22, it may proceed directly to that location without having to perform a wide area search. This greatly facilitates rescue of or contact with the individual (or group) using radio 22 and decreases the time during which the individual (or group) using radio 22 and/or the personnel in rescue unit 28 may be exposed to unfriendly action if, for example, rescue is being attempted from hostile territory. While in the present example, the local position information transmitted by radio 22 is desirably used for rescue, it may also be used by system 20 for other purposes. Radio link 29 between rescue unit 28 and radio 22 is customarily referred to as the "LOS" (line-of-sight) link, since it is often at a frequency that is suited for line of sight communication.

Figure 2:
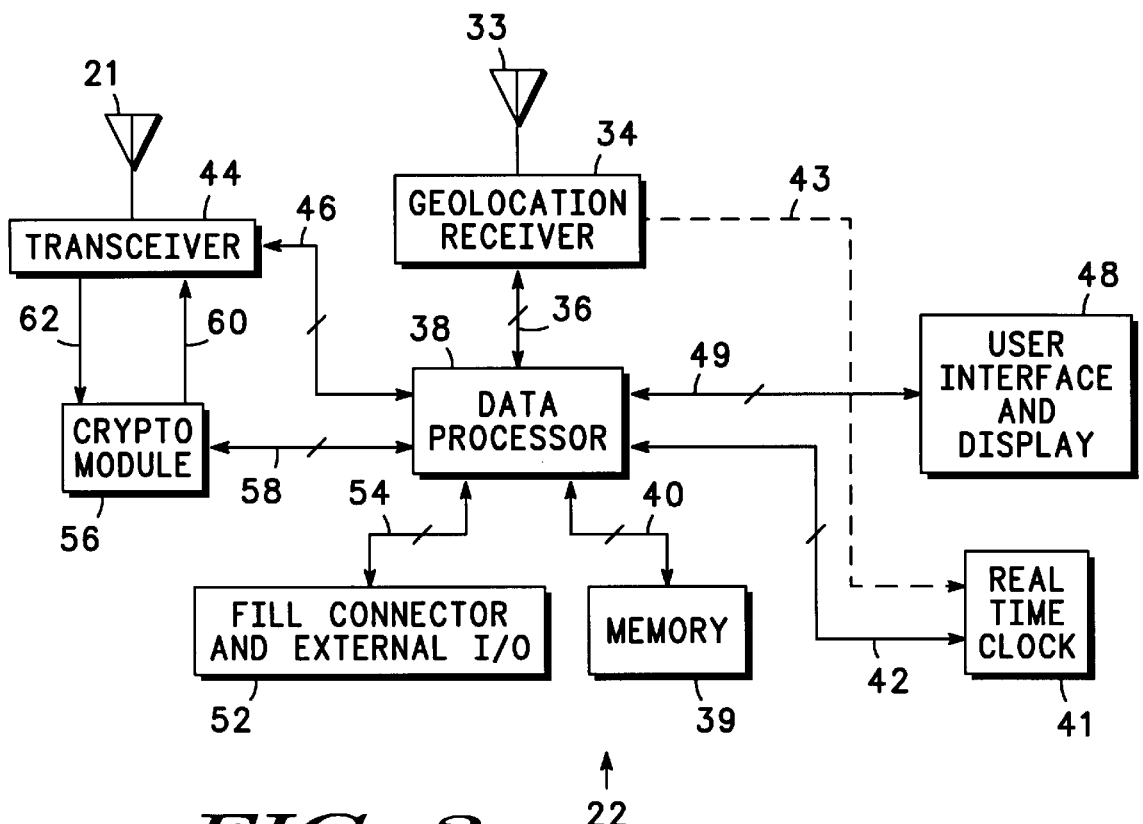
FIG. 2 shows a simplified schematic block diagram of a position locating radio according to a preferred embodiment of the present invention.

FIG. 2 shows a simplified schematic block diagram of position locating radio 22 according to a preferred embodiment of the present invention. Radio 22 comprises geolocation receiver 34 which receives geolocation signals from geolocation means 30 via down-link 32 and antenna 33 and which provides local position information as previously described. Receiver 34 is conveniently a GPS receiver however other receivers, as for example, an IRIDIUM or GLONAS receiver may also be used.

Geolocation receiver 34 also provides accurate time/frequency information based on signals received from the highly stable master clocks/oscillators in geolocation system 30. As those of skill in the art will understand, accurate time and accurate frequency are interrelated and one may be used to obtain the other.

Geolocation receiver 34 is coupled by bus 36 to data processor 38. Data processor 38 is typically a microcomputer, as for example a Type MC68HC11 microprocessor unit manufactured by Motorola, Inc., Phoenix, Az., but other microcomputer or computer or controller means well known in the art may also be used. Data processor 38 may contain onboard memory (e.g. RAM, ROM, PROM, EPROM, etc.) or such memory may be provided by memory 39 coupled to processor 38 by bus 40.

Data processor 38 is coupled to real time clock 41 by bus 42, to transceiver 44 by bus 46, to user interface and display 48 by bus 49, and to external I/O 52 by bus 54. Real time clock 41 provides timing and frequency control signals to data processor 38 and transceiver 44. Real time clock 41 is conveniently slaved, i.e., calibrated or corrected, using high accuracy time/frequency information obtained by geolocation receiver 34 from signals 32 broadcast by geolocation means 30. This accurate time/frequency information is optionally coupled from receiver 34 to clock 41 via line 43 or may be coupled via data processor 38 via busses 36, 42. Thus, receiver 22 has internally a very precise time/frequency capability which, as will be subsequently explained is desirably used to improve overall system performance.

User interface and display 48 provides status information on the system, alarm indications, message receipt acknowledgments, and various messages being transmitted and received, and controls for actuating radio 22. Interface 48 permits the user of radio 22 to input various messages or other information and to operate radio 22. For example, radio 22 may be set to transmit its local position at preset times, or may be set to transmit voice messages to rescue unit 28 or receive such or transmit other signals to satellite 24 and/or rescue unit 28 at the option of the user. Those of skill in the art will understand how to construct such user interface and display depending upon the functions and message indications desired to be provided.

External I/O (input/output) 52 conveniently provides an interface (e.g., a "fill" connector") whereby an auxiliary control unit can be used to load security keys or ID codes or other information which is temporarily stored within radio 22 and which is not conveniently or desirably loaded through user interface 48. For example, the user need not know what ID or security key has been assigned to the unit which he or she is given. This interface also conveniently permits data to be loaded in digital form. Those of skill in the art will understand how to construct such an interface depending upon the particular type of data or keys or codes desired to be input in this manner.

While data processor 38 can communicate with transceiver 44 via bus 46, it is preferable that data be passed to and from transceiver 44 via data encryption/decryption ("CRYPTO") module 56. As used herein the word "encryption" is intended to include decryption and vice-versa. Crypto module 56 is functionally coupled between data processor 38 and transmitter 44 so that data from data processor 38 passes over bus 58 to crypto module 56 and vice versa. Crypto 56 is coupled to transceiver 44 by links 60, 62. This allows geolocation data and other information and messages being provided to data processor 38 and information and messages generated within data processor 38 to be encrypted by module 56 before being sent by transmitter 44 and then via antenna 21 to satellite 24 and/or rescue unit 28. Similarly, messages received by transceiver 44 may be fed directly to data processor 38 via bus 46 or passed through module 56 for decryption. The use of crypto module 56 is desirable since it prevents unintended persons from listening in on the conversation with or data transmission to or from radio 22. In particular, the geolocation information is protected. Other types of information which are also desirably protected are user status, keys, authentication codes or pass-words, and other information messages.

Transceiver 44 is preferably a channelized receiver, that is, a transceiver which operates over a frequency spectrum subdivided into narrow bandwidth channels. The use of a channelized transceiver is desirable since it permits multiple units to communicate at the same time and in the same location without interference, each radio being assigned to use a particular channel at a particular time. Such assignments may be static or dynamic and may be user selected or be remotely controlled. Means and methods for channelized receivers are well known in the art.

Figure 3:
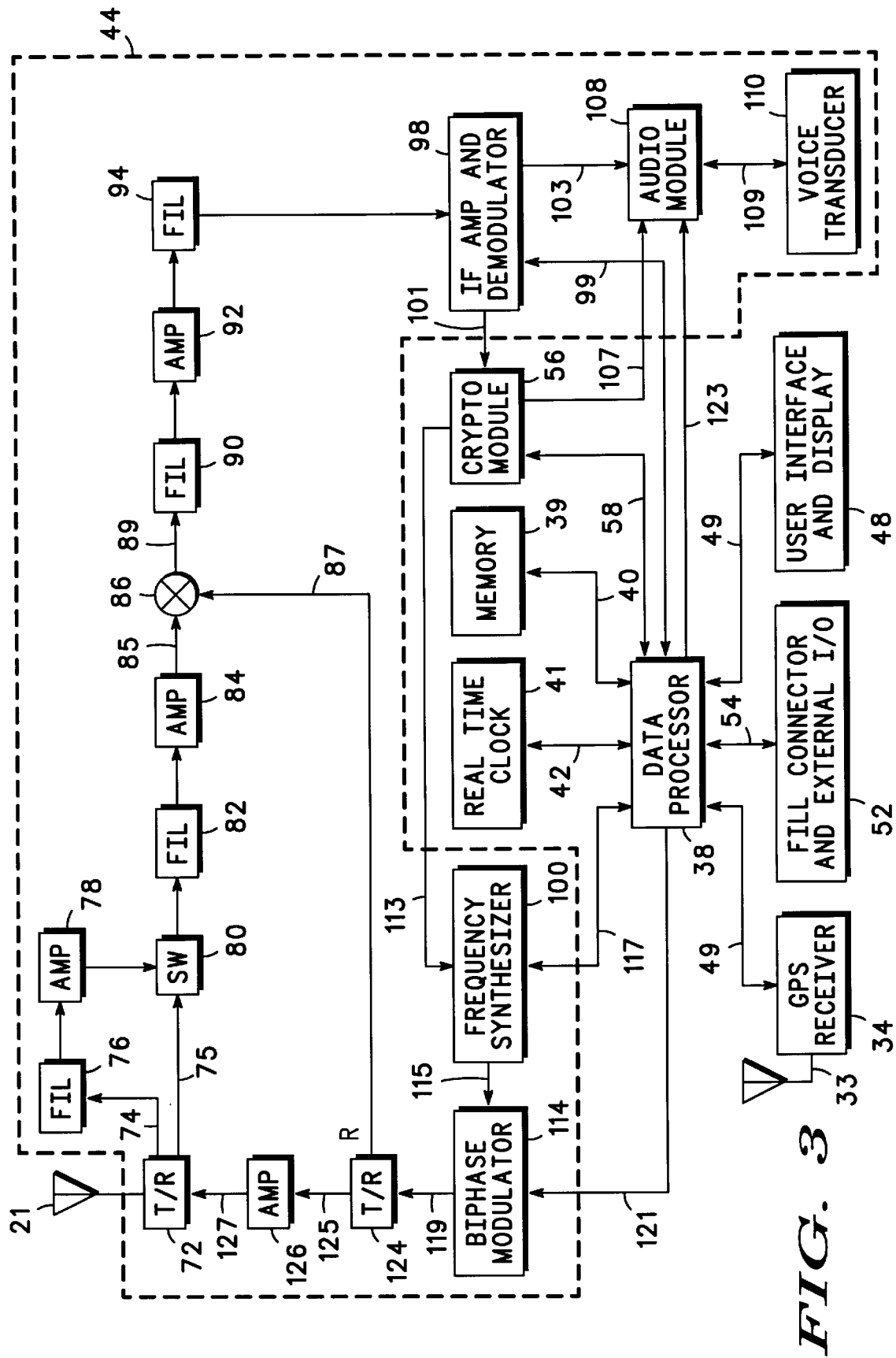
FIG. 3 shows a simplified schematic block diagram of the position locating radio of FIG. 2 in greater detail.

FIG. 3 shows a simplified schematic block diagram of position locating radio 22 of FIG. 2 in greater detail. Geolocation signals are received by antenna 33 and passed to geolocation receiver 34 which passes the decoded position information and accurate time information to data processor 38 and clock 41, as previously described. Signals to and from satellite 24 via SATCOM link 23 and to and from rescue unit 28 via LOS link 29, pass through antenna 21 to transceiver 44.

Describing now the receiver path of transceiver 44, signals arriving at antenna 21 are passed to transmit-receive (T/R) switch 72. When in the SATCOM mode, received signals from T/R switch 72 are passed via link 74 to band pass filter 76 and low noise amplifier 78 to switch 80, or when in the LOS receive mode, received signals are passed directly via link 75 from T/R switch 72 to switch 80. The path via filter 76 and amplifier 78 are preferred in the case of signals received from satellite 24 (because they are generally relatively weak) and path 75 is generally preferred for signals received from rescue unit 28 (because they are generally stronger). Switch 80 may be automatic, that is, switch to path 75 when the signal strength rises above a predetermined level, or it may be frequency selective, that is, switch to path 75 when the received frequencies are in a particular band. Those of skill in the radio arts will understand how to implement such elements. The output of switch 80 is sent to bandpass filter 82, amplifier 84 and to mixer 86 where signal 85 received from antenna 21 is mixed with a local oscillator signal on line 87 from frequency synthesizer 100.

Output signal on line 89 from mixer 86 is sent to bandpass filter 90, amplifier 92, filter 94, and IF amplifier and demodulator 98. IF amplifier and demodulator 98 is desirably of a variable bandwidth type so that its transfer properties are alterable by a signal on line 99 arriving from data processor 38 to provide wide bandwidth for LOS signals and narrow bandwidth for SATCOM signals. Output 101 containing demodulated frequency modulation information is provided to crypto unit 56 and output 103 containing demodulated amplitude modulation information is provided to audio module 108. IF/DEMOD unit 98 also passes wideband information via output line 99 to data processor 38. This information typically includes distance measuring equipment (DME) information (e.g., signal arrival time) used for retransmitting particular signals to the DME in rescue unit 28 so that it can calculate the range to radio 22.

Various encryption/decryption arrangements and apparatus may be used for crypto module 56 depending upon the desired encryption/decryption algorithm. Encryption and decryption means and methods are well known in the art, and any suitable arrangement may be used. The crypto module may be more or less complicated depending upon the degree of security desired. Where the required degree of security is not high, a simple crypto algorithm such as a substitution or look-up table or frequency or data inversion is often suitable. Where higher degrees of security are desired, a more robust algorithm should be used. Those of skill in the art will understand how to provide whatever degree of data security they desire. It is desirable that the crypto function be able to proceed in real time so as to not unduly delay transmission and receipt of the desired position information and messages.

The decrypted audio on output 107 is passed to audio amplifier and audio transmit/receive module 108, and thence via output 109 to audio input/output voice transducer 110, and vice versa. Typically, transducer 110 performs a dual function as both speaker and microphone controlled by a press-to-talk switch (not shown). Alternatively, output data bus 58 from crypto module 56 may instruct data processor to present data on display 48 or to retrieve a predetermined message from memory 39 which is then communicated to audio module 108 via path 123. Persons of skill in the art will understand how to implement such elements.

Crypto module 56 also communicates with data processor 38 over bus 58 and with the FM modulator input of synthesizer 100 via path 113. Data processor 38 controls the flow of information to and from crypto module 56. Data processor 38 also controls the action of frequency synthesizer 100 via path 117. Memory 39 is coupled to data processor 38 by bus 40.

Data processor 38 also provides on line 121 to biphase modulator 114, an outgoing data stream intended to be transmitted by radio 22. The data stream on line 121 returned in response to a LOS signal desirably has a precisely determined delay compared to the incoming LOS signal so that it may be used by rescue unit 28 to obtain range information. Modulator 114 receives carrier frequency signals on line 115 from frequency generator 100. Modulated output on line 119 from modulator 114 is passed to T/R switch 124 and from thence on line 125 (Transmit mode) to RF power amplifier 126 and T/R switch 72, and from thence to antenna 21. Output 87 from modulator 114 (Receive mode) goes to receive channel mixer 86, as previously described. The lines controlling switches 72, 80 and 124 have been omitted for clarity, but those of skill in the art will understand that they are present and that their operation is conveniently controlled by data processor 38.

Frequency synthesizer 100 is desirably a voltage controlled oscillator with internal phase lock loops or other arrangements well known in the art for generating a variety of predetermined frequencies derived from a stable master oscillator which is in turn calibrated by accurate timing or frequency signals from clock 41 and GPS receiver 34 via data processor 38. Various frequencies produced by frequency synthesizer 100 are used in transmit and receive modes. Not only does frequency synthesizer 100 provide the frequencies needed to operate on the desired transmit and receive channels, but also provides any other frequencies used internally by the transceiver for modulating or demodulating the various signals being processed. Since the output of frequency synthesizer 100 is controlled by data processor 38, the production of such frequencies for different purposes and at different times during receive and/or transmit functions is readily accomplished. Computer controlled oscillators are well known in the art. The receiver/transmitter function including encryption of the position and message information, is controlled by data processor 38.

Figure 4:
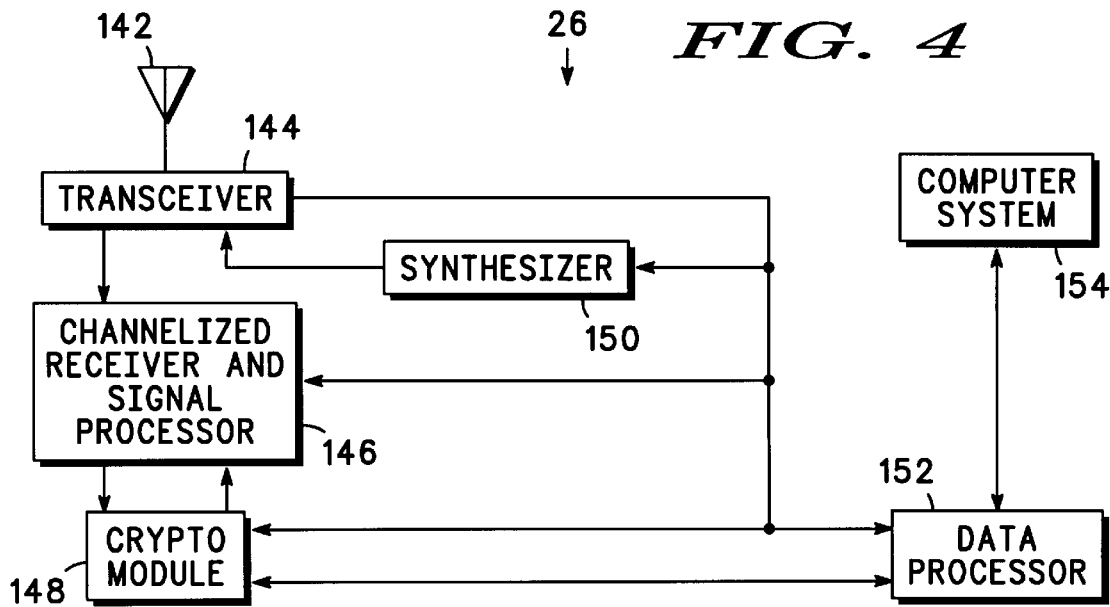
FIG. 4 shows a simplified schematic block diagram of a base station suitable for use with the position locating radio of the present invention.

FIG. 4 shows a simplified schematic block diagram of base station 26 suitable for use with the position locating radio of the present invention. Base station 26 comprises antenna 142, transceiver 144, channelized receiver and signal processor 146, crypto module 148, synthesizer 150, data processor 152 and computer system 154.

Computer system 154 is typically a personal computer system or equivalent containing, for example, a keyboard, central processor, memory for data and program storage, display and, optionally, a printer. A PS/2™ type system manufactured by IBM Corporation of Armonk, N.Y. or a Macintosh™ II type personal computer, manufactured by Apple Computer, Inc. of Santa Clara, Calif. is suitable, but other systems of equal or greater computing power may also be used. The system should be equipped with an RS232 serial interface.

A signal received by transceiver 144 through antenna 142 via satellite communication system 24 from emergency radio 22 is generally a narrow band signal but may initially fall anywhere within the satellite channel. Channelized receiver and signal processor 146 determines the frequency of the received signal and sends this information to data processor 152 which in turn adjusts frequency synthesizer 150 so that the transceiver 144 locks up on the received signal, and so that transceiver 144 will transmit back to radio 22 on the correct frequency needed by radio 22.

In the receive mode, receiver/processor 146 routes the cipher text data to crypto module 148 which decrypts the cipher-text data and passes the plain-text data to data processor 152 for further action. Data processor 152 outputs data and messages to computer system 154 which functions as the human interface of base station 26. Computer system 154 stores and displays the position information and messages and other desired information about the sender. Computer system 154 may also initiate an acknowledgment response to radio. 22 and notify rescue unit 28, either automatically or manually or a combination thereof.

In the transmit mode, the operator inputs through computer system 154 whatever messages or other commands or signals are desired to be sent to radio 22 or such messages may be generated automatically by computer system 154. This information is transferred to data processor 152 where it is assembled into the correct format for encryption and transmission, according to the protocols and keys selected by the system designer and user.

Data processor 152 also commands synthesizer 150 to set the proper transmit channel frequency and to key transceiver 144 when crypto module 148 routes encrypted data to transceiver 144 for transmission to radio 22.

One of the functions performed by base station 26 is to provide automatic acknowledgment to radio 22 that its initial position signal has been received. Base station 26 may also command radio 22 to transmit only on specified frequencies and/or only at particularly designated times and/or for particular durations or a combination thereof. Thus, while radio 22 may send out an initial emergency signal with its position information on a general purpose "sign-in" or "listen-only" or emergency channel, radio 22 can be instructed by base station 26 to shift transmission and reception to other available channels so as to leave the "listen-only" or "sign-in" channel free. Further, base station 26 can continue to send signals commanding radio 22 to further shift channels at any later time.

The operation of emergency radio 22 will be further understood by reference to the flow chart of FIG. 5 illustrating the use of radio 22 to transmit emergency signals according to method 160. In block 162, geolocation receiver 34 decodes the geolocation information from geolocation means 30 to obtain accurate position and time/frequency information. In block 164, the position information is combined with other status information about the radio or user, as for example, the user identifier, any messages desired to be sent and error detection codes provided by block 166. The assembled data is sent to crypto module 56 in block 168 and the encrypted data is then combined in block 170 with other data or synchronization bits (see FIG. 6) obtained from message leader information block 169, to make up the message to be transmitted.

The frequency to be used for transmission is selected in block 172 and transmission is accomplished in block 174. The initial message may be transmitted on a preset "sign-in" channel whose frequency is stored in radio 22, having been loaded through interface 52. Alternatively, radio 22 may send the message on a channel whose frequency is determined in block 176 based on instructions received from communication system 24 while radio 22 is in a passive, listen-only mode prior to or in between emergency transmissions.

A further feature of radio 22 is the ability to listen to communication system 24 and, knowing the frequencies that should be coming from base station 26 and satellite 24, and comparing the received frequencies to the expected frequencies using the accurate time information determined in block 162, determine the Doppler shift of received signals in block 178 and use that information to shift the frequency in block 172, shift the frequency of the signals to be transmitted in block 174. The frequency shift is desirably sufficient to compensate for the Doppler shift to be expected as the signal from radio 22 passes through communication system 24 to base station 26 so that the signal arrives at station 26 well centered in a predetermined channel. This has the advantage of reducing the signal acquisition time of the receiver in base station 26, thereby improving the performance of the whole system.

Figure 6:
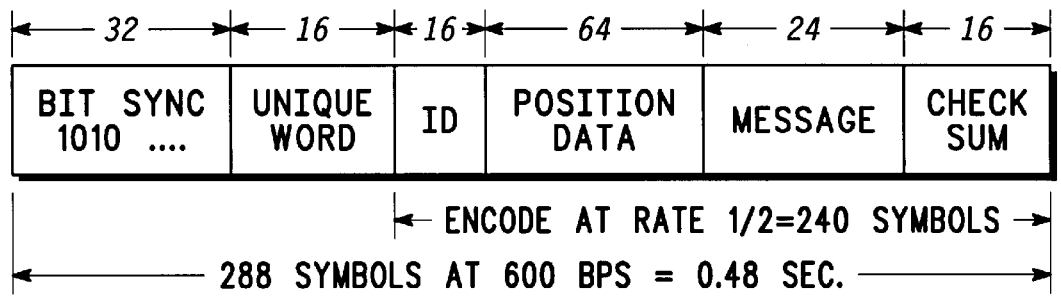
FIGS. 6–7 show mobile radio transmit and receive message protocols according to a preferred embodiment of the present invention.

FIG. 6 illustrates the preferred signal format for signals from radio 22 to base station 26 employing 288 bit signal bursts at a bit rate of 600 bps. As shown in FIG. 6, the first 32 bits are used for bit synch so that the communication receivers in base station 26 can synchronize on the bit rate. The next 16 bits are a unique word whose function is to identify the beginning of the encoded data stream. Combined, these are referred to as the "leader", and have a total of 32+16=48 bits in the preferred arrangement.

A preferred bit allocation of the 120 "message" bits is, 16 bits for a user ID, 64 bits for the position data, 24 bits for a coded message, and the final 16 bits for an error detection check sum. In order to increase the robustness of message communication, redundancy is desirably added to the "message" data stream by use of a rate ½ coder. Thus, the 120 bit "message" is desirably manipulated to provide 240 encoded bits containing the same information as the original 120 "message" bits. If some of the encoded message bits are lost during transmission, the message can still be recovered. This makes a total of 48+240=288 bits to be transmitted. Those of skill in the art will understand that the "encoding" referred to here is for the purpose of providing redundancy and is not to be confused with encryption (described elsewhere) whose function is to render the transmitted data stream opaque to any observer not possessing the appropriate algorithm and key. Encryption may be performed before or after the rate ½ coding.

By allocating 24 bits for the coded messages, a very large number (over 16 million) of predetermined messages or message combinations can be sent, each one represented by a particular bit combination. For example, using 8 bit bytes, each byte standing for one of 256 alphanumeric character or symbols, words and numbers can be spelled out or a large number of canned (pre-agreed) messages represented by particular letter/number combinations can be transmitted. Examples of simple two letter codes conveying substantial information are, "NI"="I am not injured.", "SW"="I am heading southwest.", "MU"="There are many unfriendlies in the area.,"and so forth.

Thus, substantial information can be sent back and forth between the user of radio 22 and base station 26 or rescue unit 28 during a very small and brief data burst, since 288 bits at 600 bps only requires a transmit time of about 0.48 second. This is a significant advantage to users who may be in hostile territory and who wish to keep their presence a secret from any unfriendly forces in the area. The above-described arrangement provides a system and method that is robust in terms of communication capability, location precision available to the rescuers, ease of use, portability, geographic area of coverage (virtually worldwide), message security, and being difficult to locate by hostile forces using trilateration on signal transmitted by the rescue radio.

Figure 7:
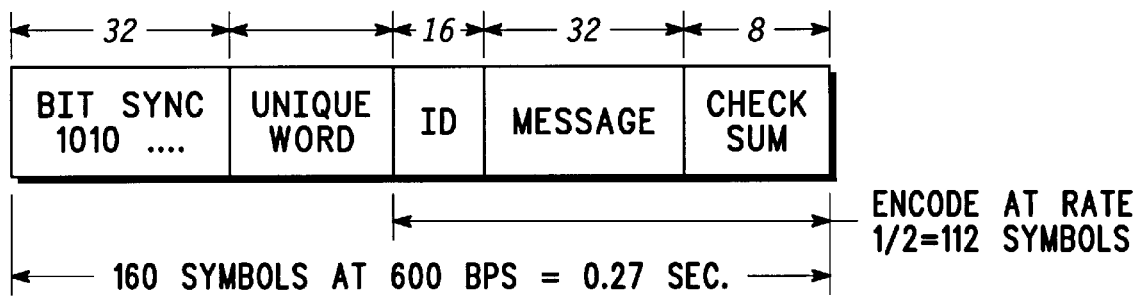

FIG. 7 indicates a preferred signal protocol for the return message from base station 26 to mobile radio 22. It is desirably about 160 bits long. There is no position data and only an 8 bit check sum is needed. Otherwise the message structure is similar with an uncoded 48 bit leader providing bit sync and a unique word, and the remaining 112 symbols distributed as shown and encoded using a rate ½ coder. At 600 bps, this message only requires 0.27 seconds transmit time. This is important in situations where a large number of emergency users must be handled at the same time. The encoded ID serve as a specific user address or identifier. The unique word at the beginning of the messages, which can be left in plain text if desired, can also serve as an address by which radio 22 can determine whether a signal relayed through satellite 24 is intended for radio 22 or another similar unit without having to decrypt each signal.

Figure 8:
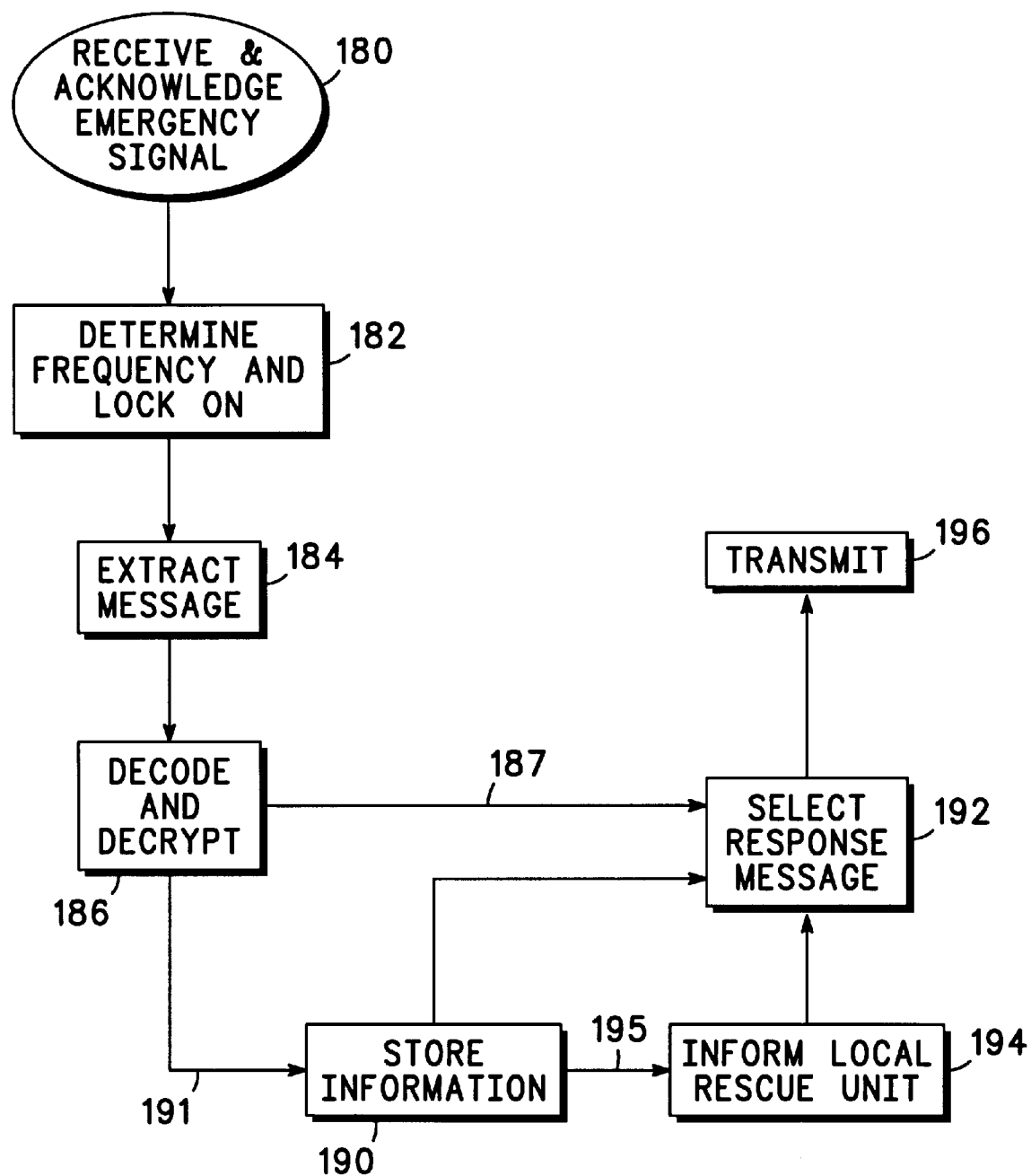
FIG. 8 shows a flow chart depicting base station signaling operation.

FIG. 8 shows the steps involved in receive/acknowledgment response 180 by base station 26, in a preferred embodiment. In block 182 the receiver determines the frequency of the incoming signal and locks on. In block 184 the signal may be sent as a whole to block 186 for decryption or the encoded "message" portion of the signal (see FIG. 6 for the signal format) separated from the leader portion and sent for decryption in block 186. An optional automatic "message received" response may be selected via path 187 and block 192 and transmitted back to radio 22 in block 196. The desired message format for messages sent by base station 26 is shown in FIG. 7. Alternatively or in addition, the position of radio 22 and any message (see FIG. 6) combined with the position information is separated and stored in block 190. The acknowledgment message (see FIG. 7) may be delayed and executed at that step as indicated by path 191, analogous to path 187.

In block 194 the position and message are passed to local rescue unit 28 and an acknowledgment signal, if not already sent, may be generated as indicated by path 195. Computer 154 or a human monitor or other agency then selects a response which is encrypted in block 192 and transmitted back to radio 22 in block 196. Any or all of the responses to radio 22 may contain instructions as to the frequencies and/or time slots radio 22 should use to listen for messages addressed to radio 22 and when and on what frequencies radio 22 should transmit further messages to station 26, and what unique address is included in the message so that radio 22 may separate its traffic from that addressed to other units.

Figure 9:
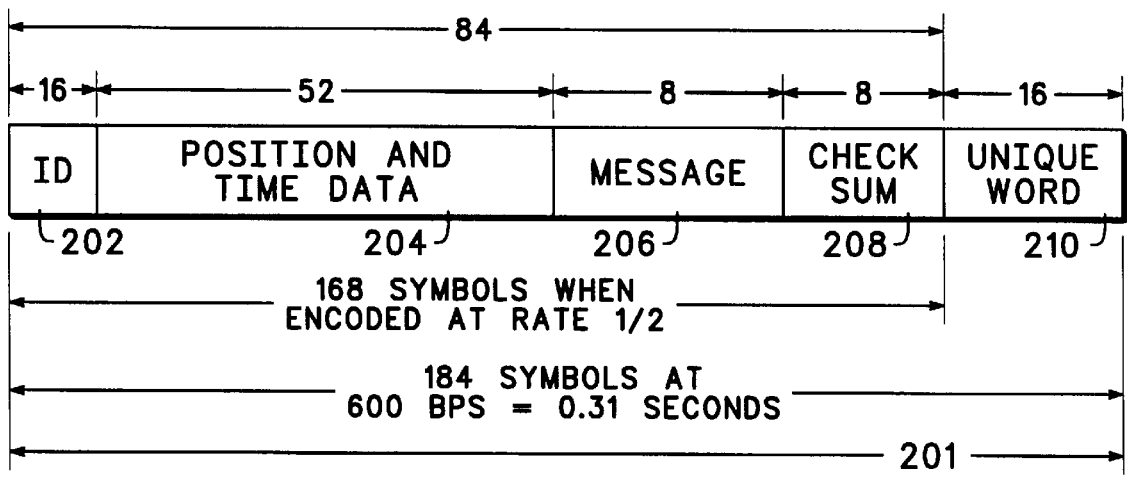
FIG. 9 shows mobile radio transmit message protocol 200 in the same manner as FIG. 6 but according to a further embodiment of the present invention.

FIG. 9 shows mobile radio transmit message protocol in the same manner as FIG. 6 but according to a further embodiment of the present invention. In the preferred arrangement of this further embodiment, message protocol 200 comprises radio ID portion 202 (e.g., 16 bits), POSITION & TIME DATA portion 204 (e.g., 52 bits), MESSAGE portion 206 (e.g., 8 bits), CHECK-SUM portion 208 (e.g., 8 bits) and UNIQUE WORD portion 210 (e.g., 16 bits). Fewer or more bits can be used for any or all of the portions 202–210 of message 200, but the examples shown are preferred because they provide a highly useful compromise between having a short burst message length (fewer bits) and conveying meaningful information (more bits) needed for a search and rescue operations, consistent with the desire to encrypt sensitive information which, if intercepted by unintended listeners, would place the person being rescued at greater risk. As used herein the words "bits" and the abbreviation of "bps" standing for "bits-per-second" are intended to include symbols and symbols-per-second, and "bits" and "ones" and "zeros" are intended to include binary or other logic states in any form.

Comparing FIGS. 6 and 9, it will be seen that in protocol 200 of FIG. 9, ID portion 202 and UNIQUE WORD portion 210 have the same number of bits as in FIG. 6, MESSAGE portion 206 has been shortened from 24 bits to 8 bits, CHECK-SUM portion 208 has been shortened from 16 bits to 8 bits and POSITION & TIME DATA portion 204 has been shortened from 64 to 52 bits and accurate time information has been included. The BIT-SYNC portion (32 bits) at the beginning of the FIG. 6 message has been eliminated. The combination of these modifications significantly shortens the overall message length, for example, from 288 bits to 184 bits, when half rate coded as shown in FIGS. 6 and 9. These message lengths correspond to a transmission burst length reduction from about 0.48 seconds to about 0.31 seconds, when transmitting at 600 bps and employing half-rate coding as shown in the respective figures. A transmission rate of 600 bps is preferred to fit within the typical five kilohertz band-width of the present day satellite transmission channels and provide robust communication. Higher or lower data rates can also be used, provided they are within the capability of the communication channel. The transmission burst length varies in direct proportion to the data rate. For example, for a 184 bit signal, the transmission burst length at data or symbol rates of 300, 600, 1200, 2400 and 4800 bps would be about 0.61, 0.31, 0.15, 0.08 and 0.04 seconds, respectively.

Figure 10:
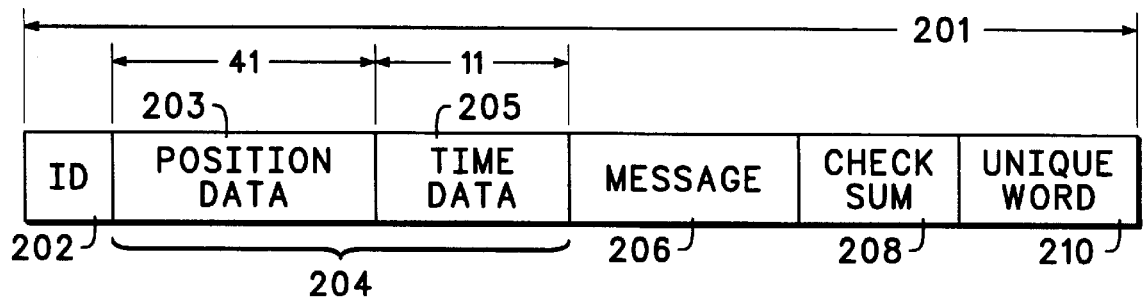
FIG. 10 is similar to FIG. 9 but showing further details.

FIG. 10 is similar to FIG. 9 but showing further details of message 200. When ID portion 202 has 16 bits, then 65,536 radios can be uniquely identified by means of ID portion 204 stored within memory 39 (see FIG. 2). ID portion 202 provides authentication that a message received at monitoring base station 26 or at rescue unit 28 has originated from a particular known radio and is not a deception signal being sent by unfriendly forces.

When MESSAGE portion 206 has 8 bits, then any of 256 user selectable pre-stored messages represented by the eight bits can be included in message 200. As previously explained in connection FIG. 2, these pre-stored messages can be loaded and altered by using fill connector and external I/O 52. Thus, the messages pre-stored in radio 22 and represented by the MESSAGE bits, may be made specific to a particular mission on which radio 22 is to be carried or to a particular individual using the radio or both.

POSITION & TIME DATA portion 204 is desirably divided into POSITION DATA portion 203 (e.g., 41 bits prior to half-rate encoding) and TIME DATA portion 205 (e.g., 11 bits prior to half-rate encoding). The information contained in TIME DATA portion 205 is derived, for example, from accurate time/frequency information provided via receiver 34 from geolocation source 30. In the preferred embodiment, TIME DATA portion 205 includes accurate time information (e.g., at least hours and minutes). TIME DATA is conveniently used to provide CRYPTO-SYNC between radio 22 and base station 26 or rescue unit 28 for encryption and decryption of the sensitive portions of message 200. For example, an encryption generator in radio 22 operating with a private key stored can be used to generate a pseudo-random bit stream which is combined with the sensitive data (e.g., ID, POSITION DATA, MESSAGE), e.g., by performing an "Exclusive-OR" step, to provide the encrypted portion of signal 200. In order to decrypt such a message, the decryption processor must determine what portion of the pseudo-random bit stream was used for encryption. This is called achieving "CRYPTO-SYNC".

In some implementations, a known preamble message has often been used to achieve CRYPTO-SYNC. However, such preamble messages are not desirable when message length needs to be kept short. With the present arrangement, the preamble can be omitted by including accurate time information (TIME DATA) in message 200. The decryption processor recovers plain-text from cipher-text by using this TIME DATA in a known way to synchronize its own pseudo-random bit steam with what was used for encryption. This CRYPTO-SYNC information is provided by transmitting, for example, accurate time corresponding to the initiation of the pseudo random code generator or corresponding to the particular portion of the pseudo-random bit stream used for encryption. Thus, TIME DATA provides a useful CRYPTO-SYNC function in transmitter and receiver without need for any CRYPTO-SYNC preamble message. This reduces the number of bits in the message since fewer bits are required for TIME DATA than would be required for an equally robust CRYPTO-SYNC preamble.

In the preferred embodiment, ID portion 202, POSITION DATA portion 203 and MESSAGE portion 206 are encrypted prior to transmission, using TIME DATA and an alterable private key. The alterable key is conveniently loaded through port 52 and stored in memory 39 prior to use of radio 22 for a particular mission or trip. Encryption may be performed using any of a wide range of encryption methods of which DES, DVP and VINSON are known, but non-limiting examples. Whether referred to generally as private-key or public-key systems, either the sender or receiver of message 200 or both must possess the private (secret) key needed so that the enciphered portions of message 200 may be comprehensible to the intended recipient. As used herein, the words "private" or "secret" key in connection with encryption or decryption are intended to encompass all such methods.

In the preferred embodiment, TIME DATA portion 205, CHECK-SUM portion 208 and UNIQUE WORD portion 210 are not encrypted prior to transmission. TIME DATA remains unencrypted since, in the preferred embodiment, it is used to rapidly acquire CRYPTO-SYNC in the decryption process at the base station. The CHECK-SUM is left unencrypted since it is used prior to decryption to determine whether the message received at base station 26 or rescue unit 28 is the same message as was transmitted by radio 22, i.e., have message bits been lost or corrupted during transmission. UNIQUE WORD portion 210 is left unencrypted since it is used to determine that a valid message has been received, irrespective of the content of the message, and irrespective of its origin. In the preferred embodiment of FIGS. 9–10, UNIQUE WORD portion 10 occupies last place in message 200.

While the use of TIME DATA is particularly convenient in connection with encryption and decryption, it is not essential and may be omitted. For example, if the encryption-decryption method chosen by a system designer does not require a CRYPTO-SYNC operation, then TIME DATA need not be transmitted for that purpose, and message 200 may be correspondingly shortened. Persons of skill in the art will understand based on the description herein and the security requirements of their intended application how to select an appropriate encryption-decryption method and whether or not to include TIME DATA for CRYPTO-SYNC purposes. Omitting the 11 bits of half-rate coded TIME DATA included in the exemplary form of message 200 shown in FIG. 9, would shorten message 200 by 22 bits, that is from 184 to 162 bits and the transmission time would drop from 0.31 to 0.27 seconds at 600 bps.

However, TIME DATA 205 may still be desirably transmitted for other purposes, as for example, to give the time and/or date of the geolocation fix from receiver 34, 34' on which POSITION DATA 203 is based. When TIME DATA is also transmitted for CRYPTO SYNCH purposes it can serve both functions. When CRYPTO-SYNC is not required, fewer bits may be allocated to TIME DATA, the exact number depending upon the precision with which one desires to known the age of the POSITION DATA. For example, if it is sufficient to know the age of the POSITION DATA to 12 minutes within a 24 hour period, then only 7 bits are required, thereby shortening message 200 to 176 symbols and reducing the transmission time at 600 bps to 0.29 seconds. The choice of whether or not to include TIME DATA and with what resolution (how many bits) will depend upon the particular needs of the intended users.

In the preferred embodiment, message 200 is tested after encryption and prior to transmission, to determine the number of logical 0-1 or 1-0 transitions. If the number of such transitions is unusually small, then it may be more difficult to rapidly and unequivocally acquire BIT-SYNC when signal 200 is received in receiving station 26, 28. To avoid this situation, signal 200 is further processed in a predetermined manner prior to transitions to increase the number of transitions without increasing the signal length. The number of transitions can be increased, for example, by subjecting the assembled message bit stream to an Exclusive-OR operation with a 101010 . . . (or other) bit stream, prior to being sent to transceiver 44, and testing to insure that the outcome has more transitions. Several stored bit streams may be tried and the most effective in increasing the number of transitions used. Other methods known in the art for increasing the number of transitions without increasing the message length can also be used. This additional step also modifies the value of the UNIQUE WORD 210 in a predetermined manner. The modified value of UNIQUE WORD indicates to receiving station 26, 28 that this additional processing has occurred and what supplementary bit stream was employed, so that it may be reversed prior to decryption or other signal processing. Persons of skill in the art will understand based on the description herein when to include such additional processing step, depending upon the BIT-SYNC process being used. The above-described operation is conveniently performed within radio 22 using processor 38, 38' operating under control of a program or sub-routine stored, for example, in memory 39.

Figure 11:
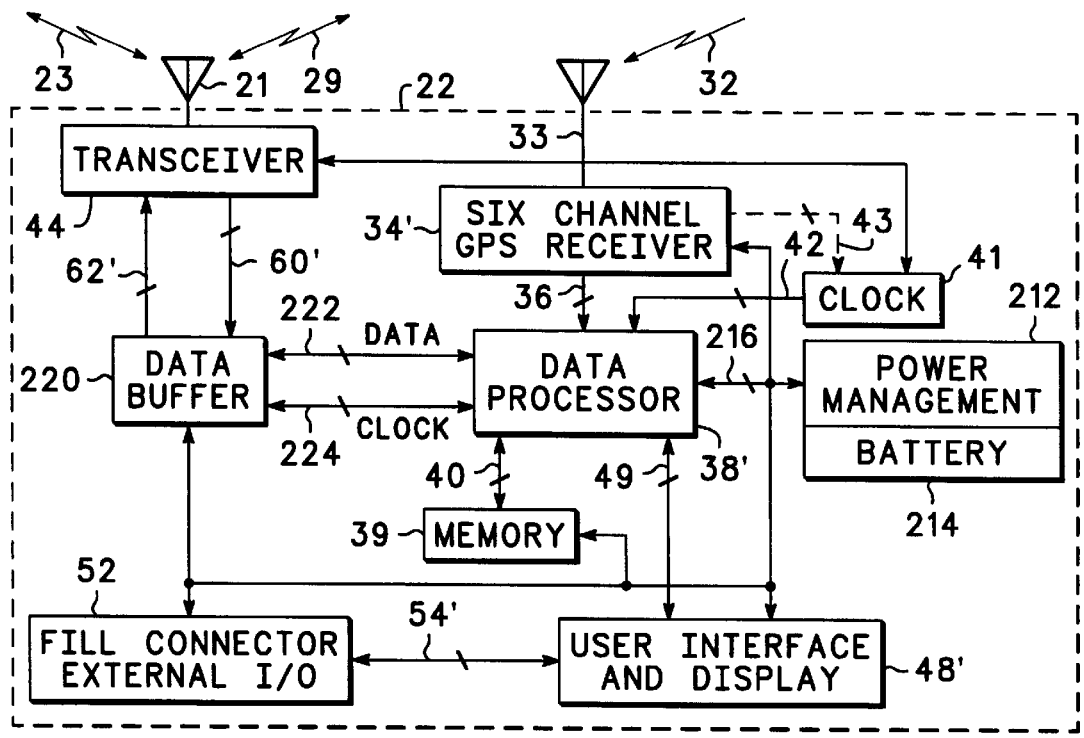
FIG. 11 is analogous to FIG. 2, showing a further embodiment of present invention.

FIG. 11, analogous to FIG. 2, shows a further embodiment of radio 22, comprising transceiver 44 and associated antenna 21 for radiating and receiving signals over links 23, 29, GPS receiver 34 and associated antenna 33 for receiving geolocation and accurate time/frequency information over link 32, receiver 34 being coupled by bus 36 to data processor 38', clock 41 coupled to GPS receiver 34 by optional link 43 and to data processor 38' by bus 42, memory 39 coupled to data processor 38' by bus 40, fill connector and external I/O 52 coupled by bus 54' to user interface & display 48' which is in turn coupled to data processor 38, by bus 49', power management unit 212 and battery 214 coupled to processor 38', user interface and display 48', GPS receiver 34 and transceiver 44 by bus 216, and data buffer 220 coupled to data processor 38' by data bus 222 and clock bus 224 and to transceiver 44 by signal paths 60', 62'. Primed reference numbers in FIG. 11 are analogous to corresponding unprimed reference numbers in FIG. 2.

The circuit of FIG. 11 differs from that of FIG. 2 in that the functions performed by crypto module 56 of FIG. 2 are now performed by processor 38' (e.g., a type 68HC11 manufactured by Motorola, Inc. or other digital signal processor) using software, and data buffer 220 is employed between processor 38' and transceiver 44 so that message 200 maybe assembled and temporarily stored prior to transmission.

Processor 38' receives geolocation information and accurate time/frequency information from GPS receiver 34 and user inputs from interface 48' and, based on instructions and data stored in memory 39 or within processor 38', performs the encryption described in connection with FIG. 10, combines resulting cipher-text portions 202, 203 and 206 with plain-text portions 205, 208 and 210 and transfers the result into data buffer 220, desirably in the order indicated, but that is not essential. Data buffer 220, delivers message portions 202–210 to transceiver 44 over link 60' so that message 200 is burst transmitted with message portions 202–210 desirably in the order shown in FIGS. 9–10, that is with portions 202–208 preceding UNIQUE WORD portion 210.

An advantageous feature of radio 22 illustrated in FIG. 11, is the provision of power manager 212 between battery 214 and the other elements of radio 22 illustrated in FIG. 11. Power manager 212 desirably operates under the control of processor 38' to manage power delivery to various of elements 34, 38', 39, 41, 44, 48', 52 and 220 of radio 22 during the process of preparing and sending message 200. Those of skill in the art will understand that the various components and elements making up radio 22 require connections to battery 214, some of which have been omitted in FIG. 11 for convenience of explanation.

Power manager 212 disconnects power to any circuits not being currently used in the functioning of radio 22 to reduce power consumption from battery 214. This extends the operating life of the radio between battery charges. A further function of power manager 214 is to shut down during encryption, all circuits (e.g., transceiver 44, user interface and display 48', fill connector and external I/O 52, etc.) except those essential to encryption (e.g., processor 38', memory 39, clock 41, etc.). This minimizes any plain-text or other signal leakage from radio 22 which might be captured by an unfriendly listener and used to decrypt or circumvent encryption of the sensitive portions of message 200. This provides what is known in the art as TEMPEST protection. This is a significant and valuable feature of the present invention.

Figure 12:
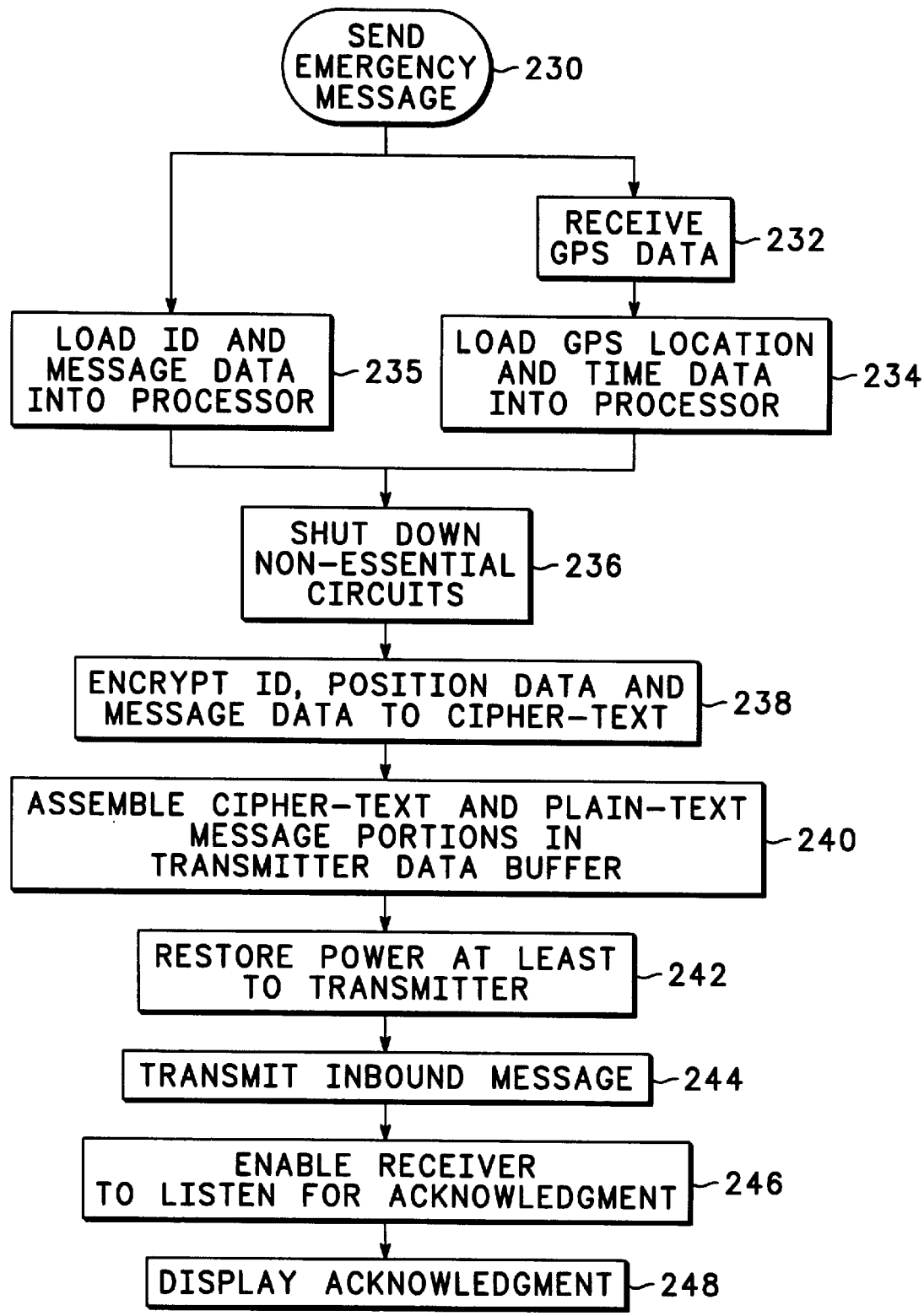
FIG. 12 is a flow chart illustrating a preferred sequence for the operation of the rescue radio of the present invention, according to a further embodiment.

FIG. 12 is a flow chart illustrating the preferred sequence 230 executed by radio 22 employing receiver 34', power manager 212 and processor 38' in preparing message 200. In step 232, receiver 34' receives GPS position and time data from down-link 32 and in step 234 transfers it to processor 38'. In step 236, processor 38' and power manager 212 shut down, preferably, all other circuits in radio 324 not needed for the operation of processor 38' to perform the desired encryption steps to generate cipher-text message portions 202, 203 and 206 (and any others that might be desired). For example, one or both of transceiver 44 and receiver 34 are powered down. Similarly, other elements of radio 22 which are not essential to the encryption process are also desirably shut down, as for example, fill connector and external I/O 52 (after the key is loaded) and user interface & display 48' (after the user has input any predetermined message choices). Data buffer 220 may also be disabled until encryption is complete, but this is not essential.

Encryption using TIME DATA and the alterable secret key, is performed in step 238 and the resulting cipher-text portions of message 200 sent to data buffer 220 along with the plain-text portions of message 200 in step 240. The encryption process is very brief, for example, of the order of a millisecond or less. Once encryption is complete, power manager 212 restores power to the other elements of radio 22, preferably in the order in which they are needed in order to transmit message 200. Thus, buffer 220 (if inactive) and transceiver 44 would be promptly re-energized so that burst transmission can occur. MSK (e.g., CPFSK) is a convenient modulation technique for message 200.

Receiver 34 is re-energized, for example, upon operator command or according to a predetermined schedule, depending upon how often position and time information or user inputs are needed. Interface and display 48' are energized to allow the user to see that an acknowledgment message has been received from base station 26 or rescue vehicle 28. Ordinarily, fill connector and external I/O 52 need not be energized until new data or a new key need to be loaded into radio 22. By deactivating all non-essential functions during encryption, undesired (TEMPEST) emissions that could compromise the encrypted message are minimized and battery life is extended.

Figure 13:
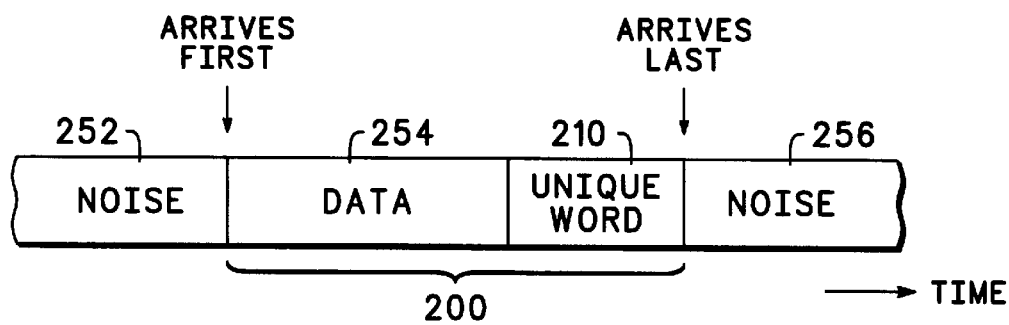
FIG. 13 is a simplified flow chart illustrating how a highly abbreviated message sent by the rescue radio of the present invention is handled in a monitoring base station, according to a further embodiment of the present invention.

FIG. 13 is a simplified flow chart illustrating how highly abbreviated message 200 is handled in base station 26 (or equivalently in rescue vehicle 28). Base station 26 receives signal 250 which comprises a noise portion 252, a subsequent coherent portion 254 which may or may not be a signal from radio 22, and a further noise portion 256. Referring now to FIGS. 4 and 13, transceiver 144 and channelized receiver and signal processor 146 detect signal 250 including coherent portion 254, and pass the resulting information to data processor 152. The received information is processed and temporarily stored. This is conveniently accomplished, for example, by digitizing and storing the IF signal extracted from receiver 146. In the preferred embodiment, the IF signal has a 10 kHz center frequency and 3 kHz bandwidth and is readily sampled and digitized using techniques well known in the art. The digitized information may be stored in any convenient location in base station 26, for example, in receiver-processor 146 or 152 or computer system 154. In the course of performing detection and analysis, the bit timing of coherent portion 254 is determined, that is, when the bits occur in time, how many there are and which are one's and zero's (or any other symbol or logical representation being used). With bit timing established, coherent portion 254 is tested to determine whether it contains UNIQUE WORD 210, a copy of which is stored or regenerated in base station 26 (or rescue vehicle 28). If a match is found, then coherent signal portion 254 is known to correspond to message 200.

Once UNIQUE WORD 210 is detected, the digitized information comprising coherent message portion 254 is retrieved from memory. In the preferred embodiment this is demodulated using the recovered carrier and BIT-SYNC timing information already obtained. The cipher-text portions are then separated from the plain-text portions and the cipher-text decrypted using TIME DATA (if needed) and the appropriate key stored in base station 26 (or rescue vehicle 28) corresponding to the alterable key previously loaded into radio 22 and used for encryption. The decryption key may be the same key in a single key system or a mating key in a binary key system. In either case, the purpose of the alterable key(s) is to render the cipher-text incomprehensible to unintended recipients, but comprehensible to the intended recipients. The data retrieved from message 200, is then displayed using computer system 154 or transmitted to other units, as for example, to rescue vehicle 28. A "message received" (ACK) response is desirably transmitted back to radio 22, as has been previously described.

The above-described process carried out in station 26, 28 receiving signal 250 is a two-pass signal recognition process. It need not occur in real time. On the first pass through the detection and analysis chain of the receiving station the coherent carrier is acquired using means well known in the art, the bit stream is detected, the bit timing is recovered from the coherent signal, the bit stream checked for the UNIQUE WORD, and a reject or reprocess decision made. In the preferred embodiment described in connection with FIGS. 9–10, the UNIQUE WORD comprises the last 16 bits of the message. The receiving station detection and analysis chain is desirably preprogrammed to sequentially (or concurrently) compare 16 bit blocks of the detected bit steam (e.g., bits 1–16, 2–17, 3–18, etc.) with the stored UNIQUE WORD to detect a match. If no match is found, the received signal does not have a portion which corresponds to message 200 and the signal is rejected. When a UNIQUE WORD match is found, then the time segment of the stored digitized signals which corresponds to message 200 is known and at least this part of the received signal is retained in memory for further processing using the carrier and BIT-SYNC information developed in the first pass. In a second pass, the relevant portion of the stored digitized information is further processed to verify the CHECK-SUM portion, to recover the TIME DATA portion (if any) and to pass the encrypted portions through decryption to extract the ID portion, the POSITION DATA portion and any MESSAGE portion.

The above-described procedure has the advantage that no BIT-SYNC leader or other preamble is needed for the message from radio 22. Message 200 serves as its own BIT-SYNC. While the UNIQUE WORD portion can be placed anywhere in message 200, it is preferably placed at the end of message 200, so that bit timing may be recovered before the UNIQUE WORD portion of the message is reached. In view of the very few bits in the total message, placing the UNIQUE WORD at the end improves the likelihood of BIT SYNC being achieved before the UNIQUE WORD arrives. This increases the robustness of the communication process and improves the probability that a message from rescue radio 22 will be identified and decrypted the first time received. Because repeated transmissions of a signal from rescue radio 22 may place the user at substantially greater risk when in the presence of unfriendly forces, minimizing the number of transmissions is an important advantage of the present invention.

Figure 14:
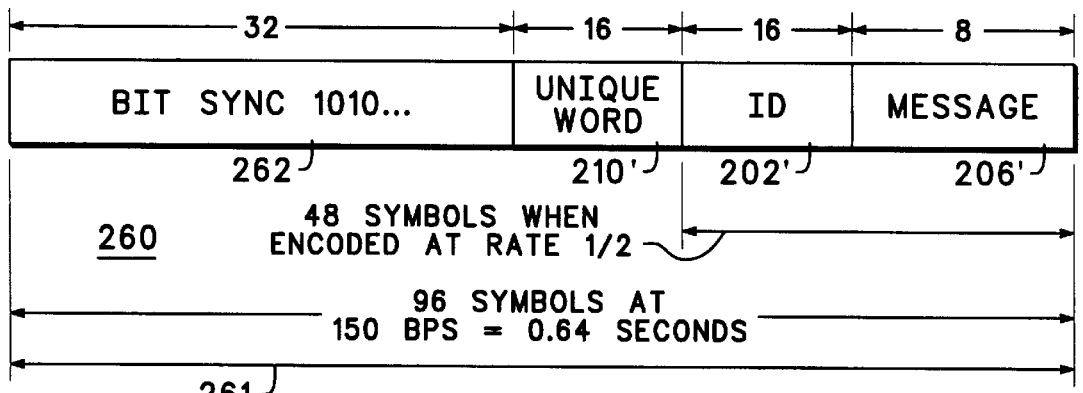
FIG. 14 shows a signaling protocol, analogous to FIG. 4, for an acknowledgment message sent from a monitoring base station or rescue vehicle to the rescue radio of the present invention in response to the message illustrated in FIGS. 9–10.

FIG. 14, which is analogous to FIG. 7, shows the preferred protocol for message 260 sent from the monitoring base station 26 or rescue vehicle 28 to radio 22 to acknowledge receipt of the message described in connection with FIGS. 9–10. The same message is also repetitively transmitted by base station 26 via satellite 24 to act as an antenna alignment signal for mobile radio 22. Message 260 comprises BIT SYNC portion 262 (e.g., 32 bits), UNIQUE WORD portion 210' (e.g., 16 bits), ID portion 202' (e.g., 16 bits) and MESSAGE portion 206' (e.g., 8 bits). When ID portion 202' and MESSAGE portion 206, are half-rate coded as indicated in FIG. 14, then message 260 has a preferred bit length of 96 bits, i.e., 52% of the preferred bit length (184 bits) of message 200.

The 32 bit BIT SYNC portion 262 of message 260 allows hand-held radio 22 to easily bit synchronize with the received signal, 16-bit UNIQUE WORD portion 210' identifies the start of the return message, and 8-bit MESSAGE portion 206' identifies one of the 256 text messages prestored in radio 22 which may be placed on display 48 or otherwise enunciated. ID portion 202' and MESSAGE portion 210' may be a null set or omitted when signal 260 is being provided prior to reception of signal 200 for antenna pointing purposes. When 16-bit ID portion 202 in message 200 was sent by radio 22 to monitoring station 26, 28 in encrypted form, only an authorized recipient possessing the necessary variable key could decrypt it and re transmit the correct ID portion 202' back to radio 22 as a part of return message 260. In the preferred embodiment, ID portion 202' may be the same as the unencrypted ID portion stored within radio 22 or may be a different but related ID portion.

For example, a particular radio 22 may have stored internally a particular value (X) for ID portion 202 which it uses to identify itself in its messages sent to monitoring stations 26, 28, and may also have stored internally, a different value (Y) for ID portion 202' which it uses to identify messages intended for it. Thus, the ID portions in the outgoing and incoming messages need not be the same. In a like manner, UNIQUE WORD portion 210' may be the same or different than UNIQUE WORD portion 210. Further, the number of different ID portions or different UNIQUE WORD portions used by a radio need not be limited merely to one or two values. Radio 22 and monitoring stations 26, 28 may be equipped with tables of random values to be used in successive communications back and forth, i.e., the ID and/or UNIQUE WORD values may be changed in a known way for each transmission. This arrangement decreases the number of unequivocal radio ID numbers and/or UNIQUE WORDS available for use by different radios at the same time. However, because each message 200, 260 contains both UNIQUE WORD portion 210 (e.g., $2^{16}$ possible values) and ID portion 202 (e.g., $2^{16}$ possible values), the total number of radios 22 that may be uniquely identified is very large ( e.g., $2^{16} \times 2^{16}$).

By considering the ID and the UNIQUE WORD together as a radio identifier, and permitting use of multiple valid UNIQUE WORDS, the total number of bits devoted to this task may be further reduced. For example, by allowing a comparatively small number (e.g., $2^8$) of UNIQUE WORDS to be valid, the number of ID bits can be reduced (e.g., from 16 to 8 bits). Because the ID bits are being encoded at rate ½. reducing the ID bits from 16 to 8, shortens the message by twice the reduction in ID bits. Thus, if this change alone is made, the number of message bits would be reduce from 184 to 168 and the burst length at 600 bps would drop from 0.31 to 0.28 seconds. If this change is combined with eliminating TIME DATA then the message is shortened by 184−16−11=157 bits and transmission time to 157/600=0.26 seconds. Having a large number of permitted UNIQUE WORDS is not desirable since it increases the base station processing time and the number of false positives, i.e., random bit sequences which appear (incorrectly) (incorrectly) to correspond to a real message. The preferred embodiment illustrated herein is a desirable compromise between these trade-offs.

Message 260 may be entirely in plain-text or may be partly encrypted, for example, in the same manner as was used in encrypting the portions of messages 200 generated by radio 22 and using the appropriate variable key. BIT SYNC portion 262 and UNIQUE WORD portion 210' are desirably in plain text and one or both of ID portion 202' and MESSAGE portion 206' are encrypted by station 26, 28 prior to transmission to radio 22 and decrypted on receipt by radio 22. In the preferred embodiment, ID portion 202' is left unencrypted so that radio 22 may quickly identify messages intended for it without the delay associated with a decryption process.

It was found that when the burst messages were shortened in the manner described above there was not a significant degradation of the quality (e.g., detectability and accuracy) and value (e.g., useful content) of the information conveyed, that is, an equally useful message with the about same probability of receipt and decryption by the monitoring station is conveyed in one-third less transmit time. When the person being rescued is exposed to unfriendly forces, minimizing the transmit time and therefore the opportunity for an unfriendly force to triangulate on the transmitter, is extremely important. Hence, this improvement has great utility and is highly desirable.

A further advantage resulting from the shorter burst transmission time from the hand-held emergency radio to the monitoring base station, in that the relative proportion of time that the base station is transmitting an antenna alignment signal to the hand held unit may be increased. This means that the hand held unit transmitting antenna may be more quickly and easily aligned to communicate with the satellite communication channel. Alignment of the transceiver antenna of the hand-held unit so as to have the maximum probability of communicating with the satellite is very desirable if the transmitter power and battery size in the hand-held unit are to be minimized. Minimizing the transmitter power is important to reduce the probability of interception by unfriendly forces and to reduce the energy drain from the battery. Minimizing battery drain is important to achieving a small size unit which still has sufficient energy reserves in the battery to allow for adequate talk (and listen) time.

Figure 15:
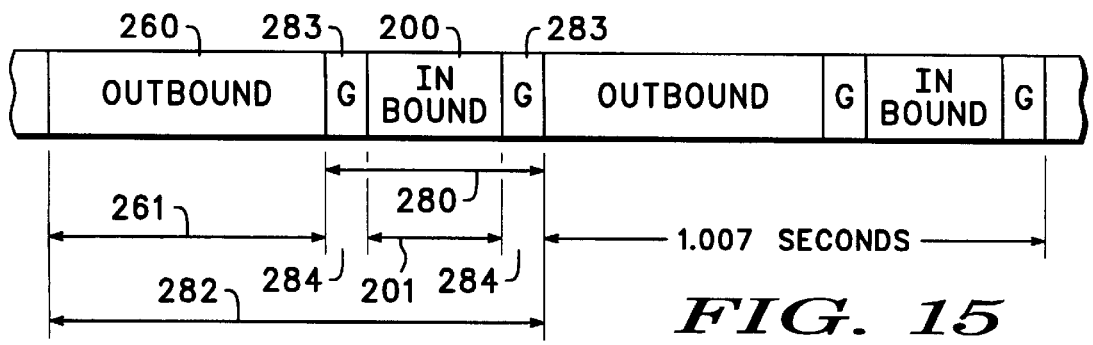
FIG. 15 shows the timing sequence of a repeated combination of the signals described in FIGS. 9 and 14, including guard bands.

FIG. 15 illustrates an arrangement in which base station 26 (see FIG. 1) transmits through satellite 24, antenna pointing signal 260 of duration 211. Base station 26 then shuts off its transmitter and energizes its receiver for time period 280 to listen to signals from emergency transceivers 22. The sum of base station transmit interval 261 and base station receive interval 280 define overall communication repeat interval 282. The relative length of time intervals 261 and 280 (or the magnitude of interval 282) depend upon duration 201 of signal 200 (see FIGS. 9–10) from hand-held unit 22 and duration 261 of signal 260 from base station 26 or rescue unit 28 (see FIG. 14). Guard band times 283 of duration 284 are provided before and after the nominal transmission time of emergency signal 200 within base station listening interval 280 to avoid losing part of signal 200 due to variations in the propagation delay. For example, if processor 38, 38' commands transceiver 44 (see FIGS. 2 and 11) to transmit burst signal 200 after the end of antenna pointing signal 260 received from base station 26, signal 200 will arrive at base station 26 approximately two propagation delays after base station 26 stopped transmitting. Thus, guard bands 283 should be at least equal to twice the longest expected propagation delay variation between radio 22 and base station 26. While guard bands 283 are illustrated as being of equal length 284, those of skill in the are will understand based on the teachings herein that this is merely for convenience of explanation and that they may be of unequal or variable length, depending upon the particular characteristics of the system being used.

In the preferred embodiment, using half-rate coding for the ID portion and MESSAGE portion as indicated in FIG. 14, 96 bits or symbols are required for message 260. Signal 260 is preferably sent as an FSK signal at a rate of about 150 bps, but lower or higher rates may be used. Using a lower bit rate for signal 260 as compared to signal 200 allows the short (96 bit) outgoing signal 260 from base station 26 (or rescue vehicle 28) to be relatively more spread out in time (96 bits/150 bps=640 milliseconds) as compared to signal 200. The low bit rate and FSK modulation provides a more robust communication capability and allows for a very simple receiver in radio 22. This improves the probability that radio 22 will receive signal 260 even under adverse conditions and reduces the overall size and cost or radio 22.

Signal 260 transmitted from the base station to radio 22 is used by the operator of radio 22 to orient antenna 21 of radio 22 to improve the probability that when radio 22 transmits message 200, it will be received by satellite 24 Eand passed to base station 26, or similarly for rescue vehicle 28. Thus, it is desirable that signal 260 occupy as large a fraction of total signal interval 282 as possible without having an unduly long signal repeat interval.

For example, the signaling arrangements illustrated in FIGS. 6 and 7 showed an "outgoing" (base 26, 28 to mobile 22) transmission time of 270 milliseconds, and an "incoming" (mobile 22 to base 26, 28) transmission time of 480 milliseconds. Assuming guardband intervals of 30 milliseconds on either side of the incoming (or outgoing) signal, the total signal repeat interval time (outgoing+guardband+incoming+guardband time) equals 270+30+480+30=910 milliseconds, of which the outgoing signal time occupied only 33%. While the overall signal repeat time is frequent enough, the comparatively small percentage occupied by the outgoing signal (used for antenna pointing) is a disadvantage.

In the embodiment illustrated in FIGS. 9, 14 and 15, outgoing signal 260 has duration 261 of (96 bits)/(150 bps)=640 milliseconds, and incoming signal 200 has duration 201 of (184 bits)/(600 bps)=307 milliseconds. Including 30 millisecond guard band durations 284, gives an overall signal repeat time of 640 30+307+30=1007 milliseconds, of which outgoing signal duration 261 occupies about 64%. Thus, a much larger proportion of the signal repeat time is provided for signal 260 from base station 26 or rescue vehicle 28 to facilitate antenna pointing by the user of radio 22. In addition, the incoming signal time has been reduced by 36% to 307 milliseconds. Radio 22 can time its transmission to fall within the 367 millisecond gap 280 between successive transmission of signal 260 second gap by noting the termination of signals 260 and then transmitting signal 200. Alternatively, high accuracy time information derived from GPS receiver 34' may be used to determine an accurate clock time when signal 200 can be sent without interfering with signal 260. In a preferred embodiment, about a 30 millisecond guard band is provided before and after transmission of signal 200. While the foregoing discussion has been made in terms of communicating from base station 26 via satellite 24 to and from mobile radio 22, this description also applies to transmissions between rescue unit 28 and mobile radio 22.

It is desirable that display 48, 48' show the received signal strength of outbound message 260 from base station 26 so as to facilitate the user being able to orient antenna 21 of radio 22 to achieve maximum coupling to satellite 24 (or rescue vehicle 28). In the preferred embodiment as illustrated in FIGS. 1 and 11, antenna 21 is a simple blade or whip antenna, preferably of a folding or retracting variety. The typical umbrella type antenna conventionally used for satellite communications is not required. Since the satellite generally cannot be seen by naked eye, having an indication when a favorable antenna orientation is achieved is highly desirable. Once radio 22 is properly oriented to as to achieve good antenna coupling to the satellite, the link margin is more than sufficient for the described purpose and robust communication may be achieved.

Based on the foregoing description, it will be apparent to those of skill in the art that the present invention solves the problems and achieves the goals set forth earlier, and has substantial advantages as pointed out herein, namely, it provides a secure mobile radio well adapted to use as an emergency radio by means of a built-in geolocation and timing receiver which provides accurate local position and time. The accurate local position is included automatically in the message sent out by the mobile radio operating in its emergency mode. The position information and messages are encrypted so that unfriendly listeners cannot locate the mobile radio or determine its status from the transmitted information.

The invented radio further provides Doppler shift correction of its transmitted signals by listening to signals transmitted through the satellite communication system to which it is tuned and by determining the frequency of received signals using accurate time/frequency information proved by the on-board geolocation receiver, and by comparing the received frequencies to predetermined anticipated frequencies and then shifting the frequency of its internal transmitter in anticipation of the Doppler shift that will be encountered by its transmitted signal as it makes its way back to the communication system base station so that the signal received at the base station is substantially Doppler free. This reduces base-station signal acquisition time. By listening to transmission from radio 22, the same procedure may be used by base station 26 to correct for the Doppler shift of signals it intends to transmit to radio 22, so as to reduce signal acquisition time in radio 22. A further feature of the invented radio is that only very short message bursts are required, generally only a fraction of a second, thereby reducing the risk of radio 22 being located by unfriendly forces. In addition, the transmitted signals may contain a unique address so that the mobile unit can uniquely identify signals directed to it from other signals on the same channel.

While the present invention has been described in terms of particular arrangement, satellites, communication systems, geolocation systems and steps, and these choices are for convenience of explanation and not intended to be limiting and, as those of skill in the art will understand based on the description herein, the present invention applies to other arrangements, satellites, communication systems, geolocation systems, and steps, and it is intended to include in the claims that follow, these and other variations as will occur to those of skill in the art based on the present disclosure.

What is claimed is:

1. A radio comprising:
   receiver means responsive to GPS satellites for receiving therefrom information permitting said radio to determine local position information describing a location of said radio;
   transceiver means for communicating with at least one remote station via a transceiver satellite, by sending a burst signal of less than one second duration including said local position information to said at least one remote station via said transceiver satellite and receiving therefrom an acknowledgment that said local position information has been received from said at least one remote station;
   one or more antennas coupled to said receiver means and said transceiver means; and
   a common hand-portable housing containing said receiver means and transceiver means and supporting said one or more antennas.

2. A device comprising:
   a geolocation receiver for providing, from geolocation means, local position information describing a location of said device;
   a transceiver coupled to said geolocation receiver for sending a message including said local position information and one or more symbols indicative of user status to a communication system;
   input means for remotely receiving user status information from said transceiver;
   processor means coupled to said input means and said transceiver, said processor means for receiving said user status information from said input means and providing to said transceiver means for inclusion in said message, said one or more symbols which correspond to said user status information;
   at least one antenna coupled to said geolocation receiver and said transceiver;
   a common housing containing said geolocation receiver, transceiver, input means and processor means and coupled to said at least one antenna; and
   said message including a user identification portion, a transceiver position data portion, a user status portion, and an error detection portion, wherein said user status portion carries multiple codewords.

3. A portable transceiver comprising:
   a first radio receiver for receiving at least one signal from a geolocation satellite system and for generating location information describing a location of said portable transceiver using said at least one signal;
   a radio transmitter for use in delivering a distress message to a remote basestation via a satellite communications system when a user of said portable transceiver is in need of assistance, said distress message including said location information and a user status message; and
   a second radio receiver for receiving a communications signal from said remote basestation;
   wherein said user status message is selected from a plurality of predefined, fixed-length, alpha-numeric codewords.

4. A portable transceiver, as claimed in claim 3, further comprising:
   a user interface for allowing said user of said portable transceiver to enter at least one of said plurality of predefined codewords for delivery to said basestation.

5. A portable transceiver, as claimed in claim 3, wherein:
   said distress message includes a user identification portion, a transceiver position data portion, a user status portion, and an error detection portion, wherein said user status portion carries multiple codewords from said plurality of predefined, fixed-length, alpha-numeric codewords.

6. A portable transceiver as claimed in claim 3, wherein:
   said communications signal includes an acknowledgment that said distress message was received by said remote basestation.

7. A portable transceiver as claimed in claim 6, further comprising:
   a detector for detecting said acknowledgment within said communications signal; and
   indicator means for indicating to a user of said portable transceiver, in response to detection of said acknowledgment by said detector, that said distress message was received by said remote basestation.

8. A portable transceiver as claimed in claim 3, wherein:
   said radio transmitter includes means for communicating with an airborne rescue vehicle dispatched by said remote basestation in response to receipt of said distress message.

9. A communicator comprising:
   a geolocation receiver for receiving information from at least one geolocation satellite, said information permitting said receiver to determine local position information describing a location of said communicator;
   a transceiver for communicating with at least one remote station via a transceiver satellite, said transceiver including a transmitter and a receiver, said transmitter for sending a burst signal including said local position information to said at least one remote station and said receiver for receiving an acknowledgment signal from said at least one remote station indicating that said burst signal has been received by said at least one remote station;
   one or more antennas coupled to said geolocation receiver and said transceiver; and
   a common hand-portable housing containing said geolocation receiver and said transceiver, said common hand-portable housing supporting said one or more antennas.

10. The communicator, as claimed in claim 9, wherein:
    said burst signal includes a message portion carrying at least one status message selected by a user of said communicator from a list of predefined messages.

11. The communicator, as claimed in claim 9, wherein:
    said burst signal comprises a user identification portion identifying a user of the communicator, a position data portion identifying a position of the communicator, a message portion carrying a user message, and an error detection portion for use in performing error detection/correction.

12. The communicator, as claimed in claim 9, further comprising:

means for indicating to a user of said communicator, in response to said acknowledgment signal, that said burst signal has been received by said at least one remote station.

13. A communicator comprising:

a geolocation receiver for providing, from geolocation satellite means, local position information describing a location of said communicator;

a transceiver coupled to said geolocation receiver for sending a message including said local position information and user status information to a satellite communication system;

input means for receiving user status information from a user of said communicator describing a present condition of said user;

processor means coupled to said input means and said transceiver, said processor means for receiving said user status information from said input means and providing said user status information to said transceiver for inclusion in said message;

at least one antenna coupled to said geolocation receiver and said transceiver; and a common housing containing said geolocation receiver, transceiver, input means, and processor means, said common housing being coupled to said at least one antenna.

14. A communicator as claimed in claim 13, wherein said message is a burst message of less than one-half second duration.

15. A communicator as claimed in claim 13, wherein said input means includes means for allowing a user of said communicator to select at least one predefined status messages for delivery to said satellite communications system.

16. A method for use during a search and rescue operation, said method comprising the steps of:

receiving a distress signal from a satellite communications system, said distress signal originating from a ground based communicator and including location information describing a location of said ground based communicator;

first transmitting, after said step of receiving, an acknowledgment signal to said communications satellite for delivery to said ground based communicator, said acknowledgment signal confirming receipt of said distress signal; and second transmitting, after said step of receiving, said location information to a rescue unit for use in locating a user of said ground based communicator.

17. The method, as claimed in claim 16, further comprising the step of:

third transmitting, after said step of receiving, a channel indication to said communications satellite for delivery to said ground based communicator, said channel indication specifying a communications channel to be used by said ground based communicator.

18. The method, as claimed in claim 17, wherein:

said channel indication specifies a frequency range within which said ground based communicator is to transmit.

19. The method, as claimed in claim 17, wherein:

said channel indication specifies a time slot within which said ground based communicator is to transmit.

20. The method, as claimed in claim 17, wherein:

said steps of first and third transmitting are performed concurrently so that said acknowledgment signal includes said channel indication.

* * * * *